UNITED STATES PATENT OFFICE.

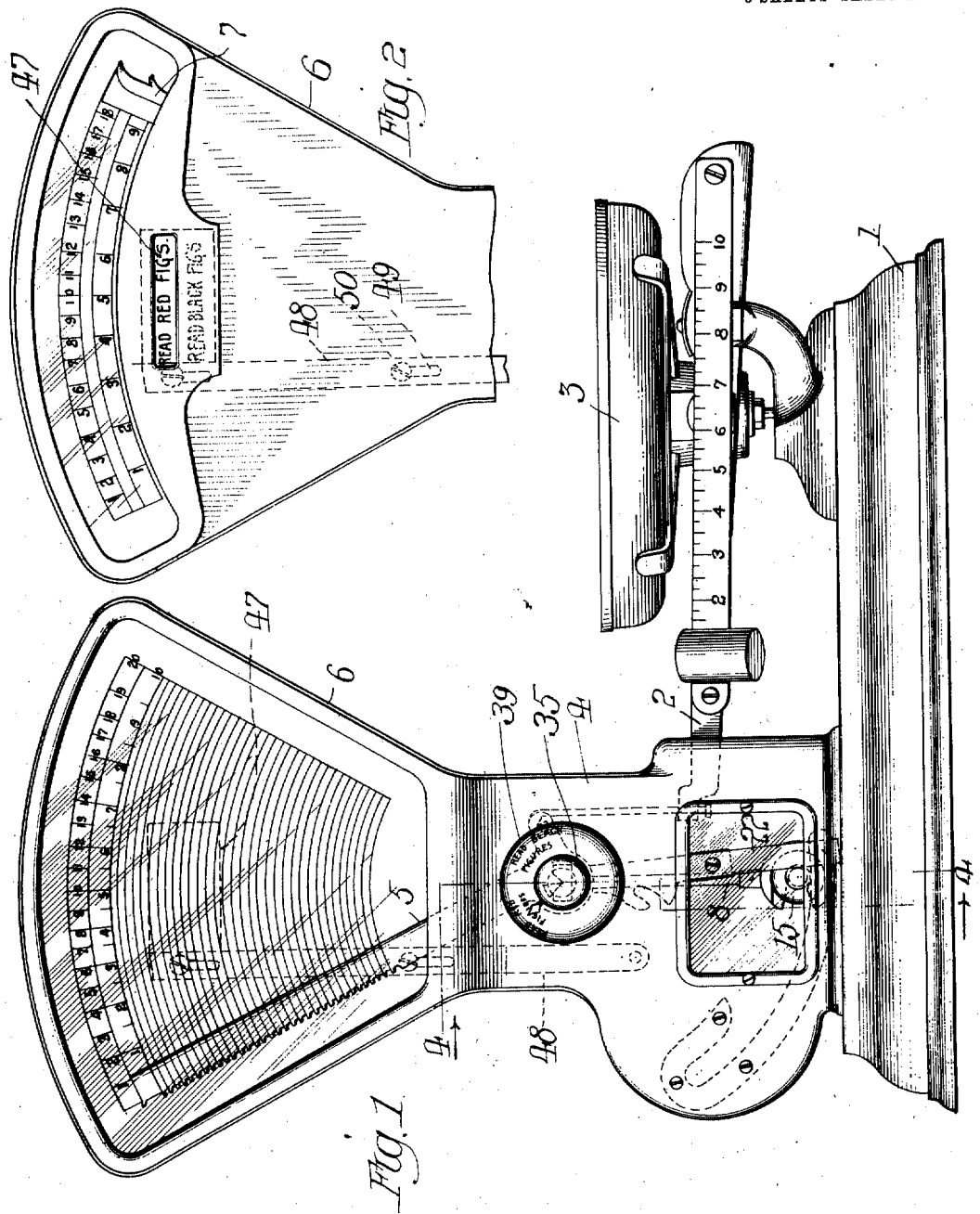

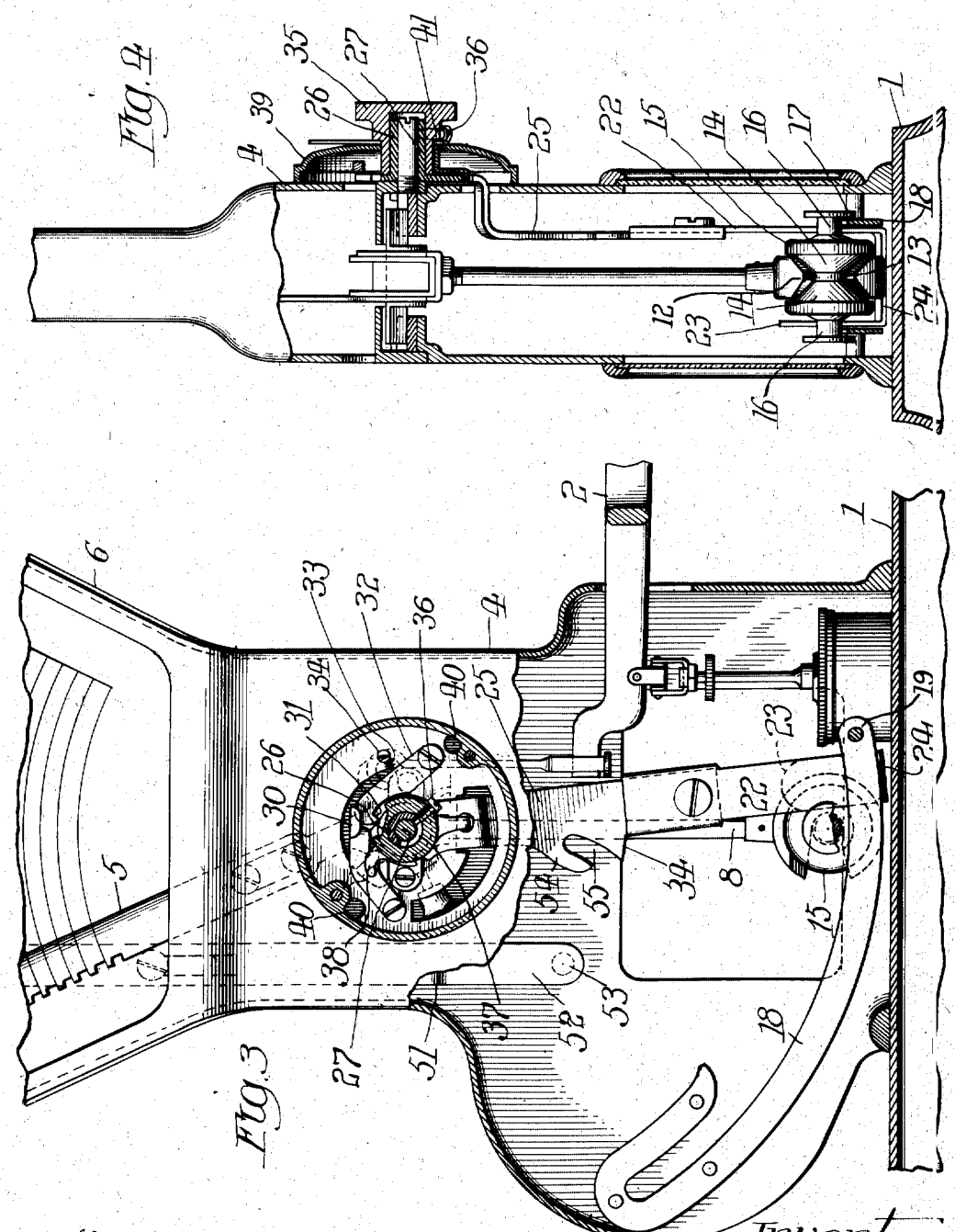

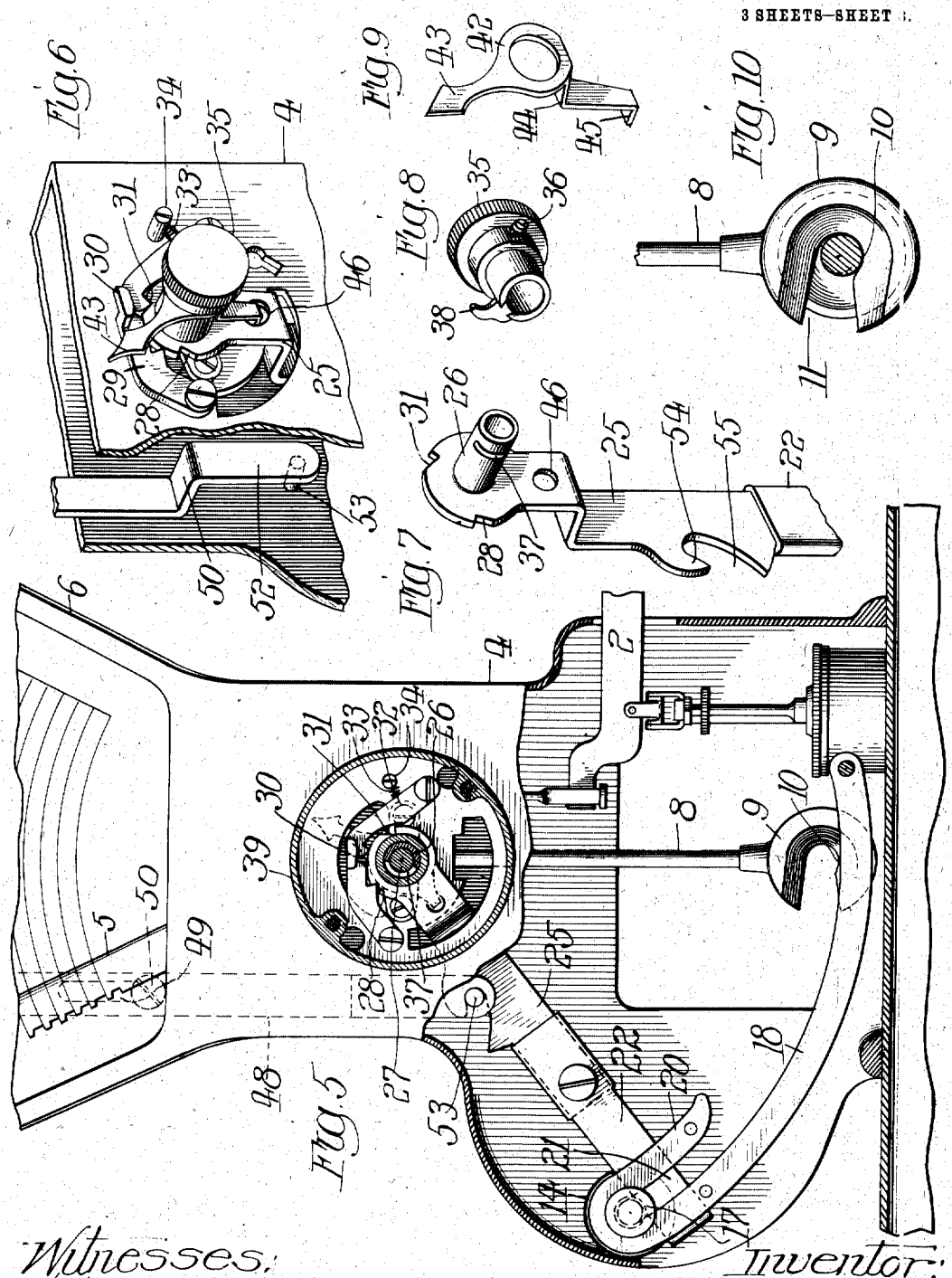

WALTER A. SHOLTY, OF TOLEDO, OHIO, ASSIGNOR TO TOLEDO COMPUTING SCALE COMPANY, OF NEWARK, NEW JERSEY, A CORPORATION OF NEW JERSEY.

WEIGHING-SCALE.

1,008,374. Specification of Letters Patent. Patented Nov. 14, 1911.

Application filed May 8, 1906. Serial No. 315,720.

*To all whom it may concern:*

Be it known that I, WALTER ALLEN SHOLTY, residing at Toledo, in the county of Lucas and State of Ohio, have invented certain new and useful Improvements in Weighing-Scales, of which the following is a specification.

The present invention relates to pendulum weighing scales and, although not confined in its uses to computing scales, it is more especially adapted for employment in this latter type of apparatus, wherein it is customary to use an auxiliary weight on the pendulum to increase at will the weighing and computing capacity of the scales.

The main object of the invention generally stated is to facilitate the displacement and replacement of such an auxiliary weight so that the scales can be readily changed from one capacity to the other.

More specifically stated, the main object of the invention is to provide means convenient of manipulation exterior of the casing of the scales and capable of removing the auxiliary weight from the pendulum, as well as causing its replacement thereon without requiring any certain positioning of the pendulum during either the process of removing or replacement.

With the above mentioned and incidental objects in view, the invention consists of certain novel features of construction and combinations of parts the essential elements whereof are recited in the accompanying claims and a preferred form of embodiment of which is described hereinafter and fully illustrated in the accompanying drawings forming part of this specification.

Of said drawings, Figure 1 represents in front elevation pendulum weighing scales of the computing variety with the present improvements embodied therein; Fig. 2 represents the chart housing viewed from the side opposite that appearing in Fig. 1, with a portion of the inclosed chart showing through the sight opening together with part of the index arm, also parts of a special indicating mechanism; Fig. 3 represents the major portion of the scales, partly in front elevation and partly in longitudinal section, the housing being represented as broken away; Fig. 4 represents this part of the scales in vertical cross-section taken approximately on the line 4—4 of Fig. 1; Fig. 5 is a view similar to Fig. 3 but showing a different adjustment of parts. Fig. 6 represents in perspective an assemblage of parts concerned in the embodiment of the present invention; Figs. 7, 8 and 9 represent in perspective some of the novel parts composing this assemblage; and Fig. 10 represents the weighted end of the pendulum in elevation with the auxiliary weight in section.

The particular type of computing scales to which the invention is shown as applied is that disclosed in De Vilbiss Re-issue Patent No. 12,029 dated September 9, 1902, and this patent may be consulted so far as the details of construction and mode of operation of this type of scales may be concerned. It will be sufficient for the purposes of the present specification to briefly point out the principal elements going to make up scales of this character.

The reference numeral 1 designates a suitable base, above which is fulcrumed a scale beam 2, supporting a scale pan 3 and connected within a housing 4 with an index arm 5 which works over a computing chart 6 and has a rear portion 7 working over two rows of weight numerals on the rear side of the chart plate. Corresponding rows of weight numerals appear on the front side of said plate just above the chart or table of computations and it is customary to inscribe them in contrasting colors. The upper rows provides for double the weight capacity of the lower row and the index arm 5 ordinarily bears two vertical rows of numerals correspondingly contrasted in color and denoting prices per unit of weight, one row for use when the scales are working in one weight capacity and the other row being used when the scales are working in the other weight capacity. The index arm 5 is compounded with a pendulum 8 arranged to swing within the housing 4 and it will be understood that the different sets of weight and price numerals are to be read according to the weighting of the pendulum. The latter carries at its lower end a permanent weight 9 of disk-like form made with a radial and slightly flaring opening 11 entering one side and extending around the center of the disk concentrically therewith. The concentric portion of the side of this opening extends through more than a half circle and the lower edge of the opening beyond the concentric portion diverges from the upper edge. Thus a slight depression 10 is formed in the lower side of the radial opening at the inner end thereof, as clearly shown in Fig. 5. The portion of the weight disk 9 immediately surrounding the said radial opening is substantially V-shaped in cross-section or edge view, as illustrated in Fig. 4, although this formation is not continued to a sharp edge but terminates in a narrow, flat surface 12. The auxiliary weight takes something the shape of a dumb-bell, comprising a reduced central portion 13 of the same lateral extent as the said flat surface 12 of the permanent weight and two side portions 14 in the form of truncated cones, whose angles correspond with those of the V-shaped portions of the permanent weight, as clearly shown in Fig. 4. Beyond these side portions 14 the auxiliary weight is formed with flanges 15 designed to take over the sides of the permanent weight beyond the V-shaped portions thereof, and from the centers of the flanged heads of the auxiliary weight project trunnions 16 with flanged ends 17 for a purpose hereinafter described.

Without proceeding further, it will be seen that the above described formation of the permanent and auxiliary weights is calculated to insure a perfectly accurate and correct engagement between them and one which cannot readily be disturbed when once established. The reduced central portion 18 of the auxiliary weight resting in the depression 10 of the permanent weight insures against accidental removal of the auxiliary weight in a radial direction and the engagement of the conical portions 14 of the auxiliary weight with the V-shaped portions of the permanent weight serves to insure the auxiliary weights properly entering the opening in the permanent weight and taking up the proper position therein. The flanges 15 also serve to prevent any possible axial displacement of the auxiliary weight. While as will hereinafter appear this particular construction or formation of the weights is of peculiar advantage in connection with the means hereinafter described for removing and replacing the weight at will, said construction and formation of the weights will be seen to possess advantages independent thereof and useful where the auxiliary weight is simply removed and replaced directly by hand.

Proceeding now to a description of the means employed for controlling the auxiliary weight, the numeral 18 designates a pair of rails mounted within the housing 4 and constituting a track upon which the auxiliary weight may travel. These rails are secured at one end in the base of the housing, as indicated at 19, on opposite sides of the pendulum somewhat beyond the limit of the latter's downward swing and they pass the permanent pendulum weight 9 on opposite sides thereof at a level slightly below the depressed portion 10 of the opening in said weight. These rails thence curve upwardly and extend to a point beyond the limits of the upward swing of the pendulum and curving back over themselves as at 20 form guide-ways or runways 21. The trunnions 16 of the auxiliary weight extend over these rails respectively and the flanges 17 take over the outer sides of the rail. It will be seen, therefore, that this auxiliary weight may roll up and down the track formed by said rails without danger of leaving the same and always preserved in proper position to enter and leave the opening in the permanent pendulum weight. The runways 21 provide for the auxiliary weights being maintained in proper position at an elevated part of the track when not engaged with the permanent weight and when the scales are in use at the lower weight capacity this auxiliary weight is retained at the upper ends of the run-ways 21, the permanent weight 9 being then free to swing through its arc without being at all influenced by the additional devices employed to change the capacity of the scales.

The auxiliary weight is moved upwardly on its track and held in its inoperative position by means of a hanger arranged to travel between the rails 18 and comprising arms 22—23 acting against the trunnions 16 and a connecting bar 24, the latter sufficiently lowered to pass underneath the permanent pendulum weight 9. The arm 22 of this bracket or hanger is secured to a pendant arm 25 which has a hub or sleeve 26 journaled upon a stud 27 fastened in the front of the housing 4 concentrically with the fulcrum of the pendulum, as shown in Fig. 4. Said arm 25 and the bracket or hanger form a unitary structure arranged to swing upon a center coincident with that of the pendulum and through a range of movement sufficient to carry the auxiliary weight entirely beyond the upward swing of the pendulum weight 9, as shown in Fig. 5, and also to leave the pendulum free as to the extent of its downward swing when carrying the auxiliary weight, as shown in Figs. 1 and 3. The upper part of the arm 25 around the sleeve 26 forms a flange which is notched at 28 for the engagement of a latch 29 pivoted at one end to the housing 4 and formed at the other end with an outwardly projecting cam lug 30. The weight of this latch tends to lower it into engagement with the notch 28 and the latter is so located as to come into operative relation with the latch when the arm 25 is swung to the limit of its upward movement. Hence the latch constitutes means for maintaining the auxiliary weight in its inoperative position, as clearly illustrated in Fig. 5. The flange portion of the arm 25 is preferably provided with a second notch 31 adapted to be entered by the hooked end of a catch 32 when the arm is at the limit of its downward swing as illustrated in Fig. 3, said catch being pivoted to the housing 4 and pressed against the notched flange by a spring 33 interposed between it and a stud 34 on the housing. This catch 32 serves the purpose of retarding the downward swing of the bracket or hanger by acting as a brake upon the disk-like portion of the arm 25. This member 32 also serves to hold the hanger or carrier yieldingly to the extreme of its downward swing, by reason of pressing against the inclined or cam-like bottom of the notch 31.

As a convenient means for swinging the hanger a knurled knob 35 is employed, the said knob being sleeved on to the hub 26 of the arm 25 and rotatively connected therewith by means of a screw 36 entered through a tapped hole in the sleeve of the knob and projecting into a circumferential groove 37 in the hub 26, said groove extending a little short of halfway around said hub. The ends of this groove constitute shoulders against which the screw 36 may act to swing the arm 25 and its bracket or hanger one way or the other. At the inner end of the sleeve of the knob there is mounted an outwardly projecting finger 38 (Figs. 3 and 8) adapted to act against the cam lug 30 to displace the latch 29 and release the hanger from its elevated position.

The parts above described which are located upon the front of the housing are preferably covered by a cap piece 39 which is secured in any suitable manner to the housing, preferably by bayonet joints as shown at 40 in Fig. 3. This cap closely embraces the sleeve of the knob 35 at a reduced portion thereof, said sleeve being shouldered to overlie the cap as shown at 41 in Fig. 4. Between the shoulder of the knob sleeve and the said cap there is loosely mounted a flat ring 42 having a pointer 43 extending over the face of the cap which is utilized as a dial being suitably inscribed to guide the operator in adjusting the scales for one weight capacity or the other. In the present instance the inscriptions employed are "Read red figures," and "Read black figures." When the scales are to be adjusted for the lower weight capacity the knob is turned so that the pointer draws attention to one or the other of these inscriptions and the operator is thus guided in reading the scales according to the weight adjustment which obtains at the time. The pointer is caused to follow the adjustments of the auxiliary weight hanger by forming the ring 42 with an inwardly extending arm 44 passing through a segmental enlargement of the opening in the cap 39 and having a depending extension 45 lying along the arm 25 and bent back at its lower end to engage an eye 46 in the latter, as shown in Fig. 6. In order to correspondingly indicate to the customer which row of weight numerals is to be consulted, a special indicator is provided in the form of a plate 47, a portion of which shows through the back of the housing 4 in Fig. 2, the outline of the plate being indicated in dotted lines in this figure and in Fig. 1. This plate bears inscriptions similar to those on the face of the cap 39, one inscription above the other, as clearly shown in Fig. 2. The plate 47 is mounted on the upper end of a rod or staff 48 vertically slotted as at 49 to engage screws 50 in the inner rear wall of the housing 4. This rod or staff 49 is off-set at 50 (Fig. 6) in order to carry it over to the inner front wall of the housing and it has a depending portion 52 extending along the latter and provided with an inwardly projecting stud or pin 53. The arm 25 is formed on one side with a lateral extension 54 having an angular open-ended slot 55. This lateral extension thus takes the form of a jaw, the lower side of which is somewhat longer than the upper side, as clearly shown upon Fig. 3, so that upon the upward swing of the arm 25 this lower side of the jaw will encounter the under side of the stud 53 and thereby elevate the staff 48 and consequently the indicator plate 47. In this manner the lower inscription on said plate is brought to view at the opening in the housing when the lower weight capacity of the scales is being employed. In the upward swing of the arm 25 which elevates this indicator plate the arc movement will carry the upper side of the jaw over the stud 53 (Fig. 5) so that when the arm 25 is swung downwardly the said indicator plate will be made to display the upper inscription thereon through the opening in the housing.

Operation: With the scale operating at its higher weight capacity the parts will be relatively positioned as illustrated in Figs. 1 and 3, the auxiliary weight being of course upon the pendulum to augment its counterbalancing effect in the weighing of goods. The bracket or hanger has left contact with the auxiliary weight and maintains a position beyond the same so as to leave the pendulum entirely free from any counter-acting influence. The spring-pressed catch 32 maintains the said hanger or bracket in this position by reason of its engagement with the base of notch 31. The latch 29 is then simply resting upon the edge of the notched flange at an intermediate point between the notches and the latch-lifting finger 38 stands off to one side of the cam lug 30, while the screw 36 is at the right hand end of the slot 37 all as clearly shown in Fig. 3, it being understood that the knob 35 has been turned to the left. At this time the pointer 43 stands over the inscription "Read red figures" as shown in Fig. 1 and the indicator plate 47 correspondingly exhibits through the opening in the rear of the housing 4 the upper one of the two inscriptions which it bears as shown in Fig. 2. To adjust the scales for the lower weight capacity it is only necessary to turn the knob 35 to the right. The first effect will be to carry the screw 36 from one end of the slot 37 to the other, the finger 38 being carried past the cam lug 30 without any effect upon the latch devices other than to simply raise the latch 29 and let it fall again against the edge of the notched flange. The continued turning of the knob causes the arm 25 and its bracket or hanger to be swung upwardly and thereby the auxiliary weight is carried out of the radial opening in the permanent pendulum weight and rolled up the inclined track provided by the rails 18 until this auxiliary weight passes beyond the limits of the pendulum swing, at which time the notch 28 will be brought beneath the catch projection of the latch 29 and immediately engaged thereby, so that the hanger is automatically caught and held in its upper position and the auxiliary weight thus suspended at the upper ends of the run-ways 21, all as clearly shown in Fig. 5.

To replace the auxiliary weight on the pendulum it is simply necessary to turn the knob to the left, which first results in causing the screw 36 to travel through the slot 37 and then as it nears the end of said slot to lift the latch 29 by reason of the action of its finger 38 against the cam lug 30. Immediately upon this taking place the arm 25 with its bracket or hanger and the auxiliary weight all fall by gravity, the said weight rolling down the inclined track and into the radial opening of the permanent pendulum weight, in which it lodges in proper position to form part of the counter-poise of the scales. In rolling into the radial opening of the permanent pendulum weight the auxiliary weight is lifted from the tracks 18 by the inclined lower edge of said radial opening and when lodged in the seat provided by the depression 10 the auxiliary weight is still removed from contact with the rails so as to swing free. As the bracket arm 25 descends in this operation it draws down the indicator staff 48 in the manner hereinbefore described so as to change the indication at the back of the scale.

It will be seen that the character of means above described for controlling the auxiliary weight do not depend at all upon any particular position which the pendulum may occupy and hence it is not necessary to provide any means for positioning this pendulum in removing the auxiliary weight therefrom or in replacing said weight. It will thus be seen that the principal object of the invention is effectively attained by the above described construction and it will also have been seen that this construction is well calculated to fulfil other objects hereinbefore set forth. At the same time it will be understood that the invention is not by any means limited to the particular embodiment herein specifically described and consequently in claims which follow essential elements are recited without limitation as to details of construction.

What is claimed is:

1. The combination with pendulum scales, of an auxiliary weight for the pendulum and manipulative mechanical means for displacing and replacing the said weight independently of any particular positioning of the pendulum, said means constituting a permanent part of the scales.

2. The combination with pendulum scales, of an auxiliary weight for the pendulum, and means for displacing the said weight, with provisions for causing its automatic replacement without requiring positioning of the pendulum to receive it.

3. The combination with pendulum scales, of an auxiliary weight for the pendulum, disengageable from the pendulum by lateral thrust in the direction of the swing of the pendulum without requiring positioning of the latter, and manipulative mechanical means for so disengaging said weight with provision for permitting its reëngagement, said means constituting a permanent part of the scales.

4. The combination with pendulum scales, of an auxiliary weight for the pendulum, disengageable from the pendulum by a lateral thrust in the direction of the swing of the pendulum without requiring positioning of the latter, and means for so disengaging said weight with provision for permitting its automatic reëngagement.

5. The combination with pendulum scales, of an auxiliary weight for the pendulum, disengageable from the pendulum by a lateral thrust in the direction of the swing of the pendulum without requiring positioning of the latter, and means for so disengaging said weight with provision for permitting its reëngagement by gravity.

6. The combination with pendulum scales, of an auxiliary weight for the pendulum, disengageable from the pendulum by a lateral thrust in the direction of the swing of the pendulum without requiring positioning of the latter and with provision for vertical relative movement between pendulum and weight, and means for so disengaging said weight with provision for permitting its reëngagement.

7. The combination with pendulum scales, of an auxiliary weight for the pendulum, a track upon which said weight may travel into and out of engagement with the pendulum, and means for moving the weight along said track and holding it out of engagement with the pendulum.

8. The combination with pendulum scales, of an auxiliary weight for the pendulum, a track upon which said weight may travel into and out of engagement with the pendulum, and means for moving the weight along said track and holding it out of engagement with the pendulum, said track extending in the direction of the pendulum swing.

9. The combination with pendulum scales, of an auxiliary weight for the pendulum, a track upon which said weight may travel into and out of engagement with the pendulum, and means for moving the weight along said track and holding it out of engagement with the pendulum, said weight being adapted to travel along the track by gravity to reëngage the pendulum.

10. The combination with pendulum scales, of an auxiliary weight for the pendulum, a track upon which said weight may travel into and out of engagement with the pendulum, a displacing member for disengaging the weight from the pendulum and propelling it along said track to a position beyond the normal range of swing of the pendulum, and a latch for said displacing member.

11. The combination with pendulum scales, of an auxiliary weight for the pendulum, a track upon which said weight may travel into and out of engagement with the pendulum, a displacing member for disengaging the weight from the pendulum and propelling it along said track to a position beyond the normal range of swing of the pendulum, a latch for said displacing member, and a handle for moving the weight displacing member and displacing the latch.

12. The combination with pendulum scales, of an auxiliary weight for the pendulum, a track along which said weight may gravitate into engagement with the pendulum, and a displacing member for disengaging the weight from the pendulum and propelling it along said track to a position beyond the normal range of swing of the pendulum.

13. The combination with pendulum scales, of an auxiliary weight for the pendulum, a track upon which said weight may travel into and out of engagement with the pendulum, and a swinging arm for propelling the weight along said track and holding it out of engagement with the pendulum.

14. The combination with pendulum scales, of an auxiliary weight for the pendulum, a track upon which said weight may travel into and out of engagement with the pendulum, a swinging arm for propelling the weight along said track and holding it out of engagement with the pendulum, and a latch for said arm.

15. The combination with pendulum scales, of an auxiliary weight for the pendulum, a track upon which said weight may travel into and out of engagement with the pendulum, a swinging arm for propelling the weight along said track and holding it out of engagement with the pendulum, a latch for said arm and a handle for moving the latter and displacing the latch.

16. The combination with pendulum scales, of an auxiliary weight for the pendulum, a track upon which said weight may travel into and out of engagement with the pendulum, a swinging arm for propelling the weight along said track and holding it out of engagement with the pendulum, and a knob for swinging the arm in a direction to disengage the weight from the pendulum.

17. The combination with pendulum scales, of an auxiliary weight for the pendulum, a track upon which said weight may travel into and out of engagement with the pendulum, a swinging arm for propelling the weight along said track and holding it out of engagement with the pendulum, and a knob for swinging the arm in a direction to disengage the weight from the pendulum, said knob being rotatively engaged with the arm with provision for lost motion.

18. The combination with pendulum scales, of an auxiliary weight for the pendulum, a track upon which said weight may travel into and out of engagement with the pendulum, a swinging notched arm for propelling the weight along said track and holding it out of engagement with the pendulum, and a latch for said arm.

19. The combination with pendulum scales, of an auxiliary weight for the pendulum, a track upon which said weight may travel into and out of engagement with the pendulum, a swinging arm for propelling the weight along said track and holding it out of engagement with the pendulum, a latch for said arm, and a knob rotatively engaged with the swinging arm with provisions for lost motion.

20. The combination with pendulum scales, of an auxiliary weight for the pendulum, a track upon which said weight may travel into and out of engagement with the pendulum, a swinging arm for propelling the weight along said track and holding it out of engagement with the pendulum, a latch for said arm, and a knob rotatively engaged with the swinging arm with provisions for lost motion, said knob having a latch-displacing projection.

21. The combination with pendulum scales, of an auxiliary weight for the pendulum, a track upon which said weight may travel into and out of engagement with the pendulum, a swinging arm for propelling the weight along said track and holding it out of engagement with the pendulum, and an indicator operated by the swinging arm.

22. The combination with pendulum scales, of an auxiliary weight for the pendulum, a track upon which said weight may travel into and out of engagement with the pendulum, a swinging arm for propelling the weight along said track and holding it out of engagement with the pendulum, and an indicator plate raised and lowered by the swinging arm.

23. The combination with pendulum scales, of an auxiliary weight for the pendulum, a track upon which said weight may travel into and out of engagement with the pendulum, a swinging arm for propelling the weight along said track and holding it out of engagement with the pendulum, said swinging arm having a laterally extending jaw, and an indicator having a lug engaged by said jaw.

24. The combination with pendulum scales, of an auxiliary weight for the pendulum, a track upon which said weight may travel into and out of engagement with the pendulum, a swinging arm for propelling the weight along said track and holding it out of engagement with the pendulum, said swinging arm having a laterally extending jaw, and a vertically movable indicator plate having a lug engaged by said jaw.

25. In automatic weighing scales, the combination with the pendulum, of an auxiliary weight having trunnions, a gravity track for said weight, and means for moving the weight up the track to disengage it from the pendulum.

26. In automatic weighing scales, the combination with the pendulum of an auxiliary weight having flanged trunnions, a gravity track for said weight and means for moving the weight up the track to disengage it from the pendulum.

27. In automatic weighing scales, the combination with the pendulum, of an auxiliary weight having trunnions, a gravity track for said weight and a swinging arm engaging said trunnions to move the weight up the track, substantially as and for the purpose described.

28. In scales of the character described, the combination with the pendulum and the removable weight therefor; of a swinging carrier for removing the weight from the pendulum, and means for holding said carrier in position to detain the weight beyond the range of movement of the pendulum.

29. In scales of the character described, the combination with the pendulum and the removable weight therefor; of a swinging carrier for removing the weight from the pendulum, and a latch for holding said carrier in position to detain the weight beyond the range of movement of the pendulum.

30. In scales of the character described, the combination with the pendulum and the removable weight therefor, of a swinging carrier for removing the weight from the pendulum, a gravity latch for holding said carrier in position to detain the weight beyond the range of movement of the pendulum, and means for displacing the latch at will.

31. In scales of the character described, the combination with the pendulum and the removable weight therefor; of a swinging carrier for removing the weight from the pendulum, a gravity latch for holding said carrier in position to detain the weight beyond the range of movement of the pendulum, and a knob equipped to displace said latch.

32. In scales of the character described, the combination with the pendulum and the removable weight therefor; of a swinging carrier for removing the weight from the pendulum, a gravity latch for holding said carrier in position to detain the weight beyond the range of movement of the pendulum, an oscillatory knob, means connected to the knob whereby when the latter is moved one way the carrier will be swung and when moved the other way the latch will be displaced.

33. In scales of the character described, the combination with the pendulum and the removable weight therefor; of a swinging carrier for removing the weight from the pendulum, means for holding said carrier in position to detain the weight beyond the range of movement of the pendulum in one direction, and means for yieldingly holding said carrier at the other end of its swing when the weight is on the pendulum, out of range of the latter's swing.

34. In scales of the character described, the combination with the pendulum and the removable weight therefor; of a swinging arm for removing said weight from the pendulum said arm having a disk-form inner end with an eccentric or cam-edge, and a spring-pressed finger engaging the latter to yieldingly hold the arm at one end of its swing when the weight is on the pendulum.

35. In scales of the character described, the combination with the pendulum and the removable weight therefor; of a swinging arm for removing said weight from the pendulum, said arm having a disk-form inner end with an eccentric or cam-edge, and a spring-pressed finger engaging the latter to yieldingly hold the arm at one end of its swing when the weight is on the pendulum, said finger also serving as a brake to retard the arm when swinging down with the weight.

36. In scales of the character described, the combination with the pendulum and the removable weight therefor; of a swinging arm for removing said weight from the pendulum, said arm having a disk-form inner end with an eccentric or cam-edge, and a notch, a gravity latch for engaging said notch to hold the arm elevated with the weight upon it out of range of the pendulum, and a spring-pressed finger engaging the edge of said disk-form portion of the arm; substantially as and for the purpose described.

37. In scales of the character described, the combination with the pendulum and the removable weight therefor, of a swinging arm for removing said weight from the pendulum, said arm having a disk-form inner end with an eccentric or cam-edge, and a notch, a gravity latch for engaging said notch to hold the arm elevated with the weight upon it out of range of the pendulum, a spring-pressed finger engaging the edge of said disk-form portion of the arm, and an oscillatory knob equipped to carry the arm with it when turned one way, and to displace the latch when turned the other way.

38. In pendulum scales, the combination of the pendulum having a vertically disposed permanent weight, a removable weight adapted to seat therein and having laterally projecting trunnions, and means for removing and replacing said weight into the path of movement of which means the trunnions of the weight extend when in position on the permanent weight.

39. In pendulum scales, the combination of the pendulum having a vertically disposed disk-form permanent weight with an opening in one side, a removable weight having a reduced central portion to seat in said opening and enlarged side portions and laterally projecting trunnions, and means for removing and replacing said weight by its trunnions.

40. In scales of the character described, the combination with the pendulum and the removable weight therefor, of a swinging carrier for removing the weight from the pendulum, means for holding said carrier in position to detain the weight beyond the range of movement of the pendulum, and an index operated by said carrier.

41. In scales of the character described, the combination with the pendulum and the removable weight therefor, of a swinging carrier for removing the weight from the pendulum, means for holding said carrier in position to detain the weight beyond the range of movement of the pendulum, a sliding index, connections between the carrier and index whereby the movement of the former operates the latter.

42. In scales of the character described, the combination with the pendulum and the removable weight therefor, of a swinging carrier for removing the weight from the pendulum, means for holding said carrier in position to detain the weight beyond the range of movement of the pendulum, a knob controlling said means and operating said carrier, and an index operated by said knob.

43. In scales of the character described, the combination with the pendulum and the removable weight therefor, of a swinging carrier for removing the weight from the pendulum, means for holding said carrier in position to detain the weight beyond the range of movement of the pendulum, a knob controlling said means and operating said carrier, an index operated by said knob, and an index operated by said carrier.

44. In scales of the character described, the combination with the pendulum and the removable weight therefor, of a swinging carrier for removing the weight from the pendulum, means for holding said carrier in position to detain the weight beyond the range of movement of the pendulum, a knob controlling said means and operating said carrier, an index operated by said knob, and a sliding index operated by said carrier.

45. In a scale, the combination of a pendulum, a removable weight therefor, a hanger or conveyer for such weight swinging in the same general direction as the pendulum and adapted to remove the weight therefrom and take it beyond the pendulum's swing, with provisions for release of the weight and its replacement on the pendulum accompanied by a reverse swing of the conveyer; and an indicator for showing whether the weight is on or off the pendulum.

46. In a scale, the combination of a pendulum, a removable weight therefor, a hanger or conveyer for such weight swinging in the same general direction as the pendulum and adapted to remove the weight therefrom and take it beyond the pendulum's swing, with provisions for release of the weight and its replacement on the pendulum accompanied by a reverse swing of the conveyer; and an indicator for showing whether the weight is on or off the pendulum, said indicator being shifted one way or the other by the said conveyer.

47. In a scale, the combination of a pendulum, a removable weight therefor, a hanger or conveyer for such weight swinging in the same general direction as the pendulum and adapted to remove the weight therefrom and take it beyond the pendulum's swing, with provisions for release of the weight and its replacement on the pendulum accompanied by a reverse swing of the conveyer; and indicating devices coördinating with said conveyer to show the customer and the operator whether the weight is on or off the pendulum.

48. In a scale, the combination of a pendulum, a removable weight therefor, a hanger or conveyer for such weight swinging in the same general direction as the pendulum and adapted to remove the weight therefrom and take it beyond the pendulum's swing, with provisions for release of the weight and its replacement on the pendulum accompanied by a reverse swing of the conveyer; a handle for controlling the conveyer, and an index device operated by said handle to show whether the weight is on or off the pendulum.

49. In a scale, the combination of a pendulum, a removable weight therefor, a hanger or conveyer for such weight swinging in the same general direction as the pendulum and adapted to remove the weight therefrom and take it beyond the pendulum's swing, with provisions for release of the weight and its replacement on the pendulum accompanied by a reverse swing of the conveyer; a handle for controlling the conveyer, an index device operated by said handle to show whether the weight is on or off the pendulum, and an indicator operated by the conveyer for similarly notifying the customer.

50. In a scale, the combination of a pendulum and removable weight therefor, means for removing the weight from the pendulum and movable only in a definite path and adapted to remove the removable weight from the pendulum at any position of the latter.

WALTER A. SHOLTY.

Witnesses:
ALLEN DE VILBISS, Jr.,
M. L. THOMPSON.